United States Patent

[11] 3,625,157

| [72] | Inventor | William Barrie Hart<br>Burwell, England |
|---|---|---|
| [21] | Appl. No. | 835,581 |
| [22] | Filed | June 23, 1969 |
| [45] | Patented | Dec. 7, 1971 |
| [73] | Assignee | Tracked Hovercraft Limited<br>London, England |
| [32] | Priority | June 24, 1968 |
| [33] | | Great Britain |
| [31] | | 29,983/68 |

[54] GAS CUSHION LOAD-SUPPORTING DEVICE
10 Claims, 5 Drawing Figs.

[52] U.S. Cl..................................................... 104/23 FS,
180/129
[51] Int. Cl....................................................... B60v 1/04,
B60v 1/16
[50] Field of Search........................................ 180/127,
128, 129; 104/148, 23 FS, 134

[56] References Cited
UNITED STATES PATENTS

| 3,249,165 | 5/1966 | Chaplin, Jr. .................. | 180/128 |
| 3,339,657 | 9/1967 | Bertin et al. .................. | 180/127 |
| 3,381,627 | 5/1968 | Hart et al....................... | 104/134 |
| 3,486,577 | 12/1969 | Jackes........................... | 180/127 |

*Primary Examiner*—Arthur L. La Point
*Assistant Examiner*—Richard A. Bertsch
*Attorney*—Cameron, Kerkam and Sutton

ABSTRACT: A gas cushion load-supporting device, particularly useful for a tracked gas cushion vehicle, has a member with a nozzle for forming a peripheral jet for containing a gas cushion. This cushion member is movable with respect to a load-supporting structure. The nozzle has a movable wall which is connected to the supporting structure through a linkage so that movement of the cushion member towards the structure opens the nozzle thus increasing the jet thickness. The results in the height of the cushion member above the track remaining more nearly constant.

GAS CUSHION LOAD-SUPPORTING DEVICE

This invention relates to a gas cushion load-bearing device and has particular application in a vehicle for travelling along a prepared track which guides the vehicle. Vehicles of this kind are disclosed in British Pat. No. 995,127 and a method of propelling them in British Pat. No. 1,002,588. Such vehicles are capable of high speeds, for instance faster than 200 kilometers per hour.

It is an object of this invention to provide a gas cushion device particularly applicable in supporting a vehicle which minimizes the risk of the device touching the surface above which the vehicle is supported.

According to the present invention there is provided a gas cushion load-supporting device including a load-supporting structure and a gas cushion member, the gas cushion member having nozzle means for forming a curtain of moving gas to assist in containing a cushion of pressurized gas for supporting a load from a surface, the cushion member being movable with respect to the load-supporting structure, and including means for adjusting the nozzle means to increase the cushion-containing quality of the curtain upon movement of the cushion member towards the load-supporting structure.

The pressure in the cushion is dependent on the hoverheight (i.e. the distance between the cushion member and the surface) and the cushion-containing quality of the curtain. When the device is supporting a vehicle and the vehicle encounters a minor rise in the track, the hoverheight will decrease and the cushion pressure will increase so that the cushion member will move towards the vehicle. In accordance with the invention it can be arranged that the cushion-containing quality of the curtain increases. By appropriately choosing the amount by which the curtain-containing quality is changed for a given movement, the height of the cushion member from the track can be kept more nearly constant.

The cushion-containing quality of the curtain can be varied by varying the angle of the one or more gas outlet ports which form the curtain-forming means, since an inwardly inclined port produces a greater cushion-containing effect than a port that directs the curtain at right angles to the surface. Alternatively the cushion-containing quality can be varied by varying the mass flow through one or more fixed gas outlet ports, e.g. by means of valves or, preferably, by varying the effective area of the one or more gas outlet ports, to vary the curtain thickness.

Preferably, as in the described embodiment, the cushion member has curtain-forming means along at least two opposite sides of the cushion member, and the device includes means for adjusting the curtain-forming means along one side of the cushion member to increase the cushion-containing quality of the curtain on said side with respect to the other side when said one side moves closer than the other side to the load member.

The means for varying the effective area of the curtain-forming means preferably includes a linkage connecting a movable wall of the curtain-forming means with the load member. Where the area of the curtain-forming means on one side can be increased with respect to the other side, there is preferably a linkage on each side connecting a movable wall of the curtain-forming means with the load member on the same side.

The linkage or linkages are preferably adjustable, to set the initial effective area of the curtain-forming means to suit the load carried by the device.

The curtain-forming means preferably includes a wall pivoted at its outer edge and inclined so that the free edge is further than the pivoted edge from the load member, thus forming an inwardly directed gas outlet port.

Preferably the cushion member is connected to the load member by a flexible membrane arranged so that in use there is increasing resistance to movement of the cushion member as it approaches the load member.

When the preferred device is supporting a vehicle and is arranged so that the opposite sides of the cushion member extend in the direction of travel, it will act to counter any tendency for the vehicle to roll. This is because when the vehicle rolls one side of the load member will approach the track more closely than the other side. The cushion member will tend to remain parallel with the track and therefore one side will be closer to the load member than the other. The gas outlet ports will therefore be opened on the lower side of the vehicle more than on the other side so that the thickness of the curtain on the lower side will be greater than on the other. The local cushion pressure will therefore increase on the lower side and the righting couple will be exerted on the gas cushion member. This will then be referred back to the vehicle by the flexible membrane.

The gas cushion load-bearing device according to the invention can be used to support a vehicle from a substantially horizontal surface, or can be used to guide a vehicle from a substantially vertical surface.

Figure 1:
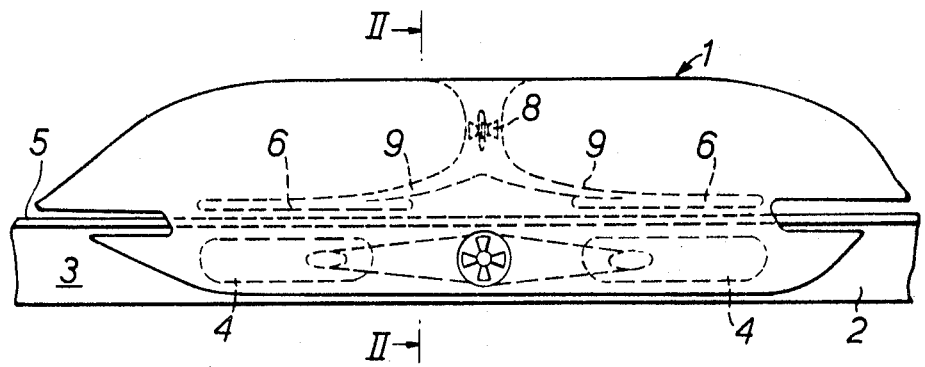
FIG. 1 is a diagrammatic side view of a vehicle mounted on a track.
Figure 2:
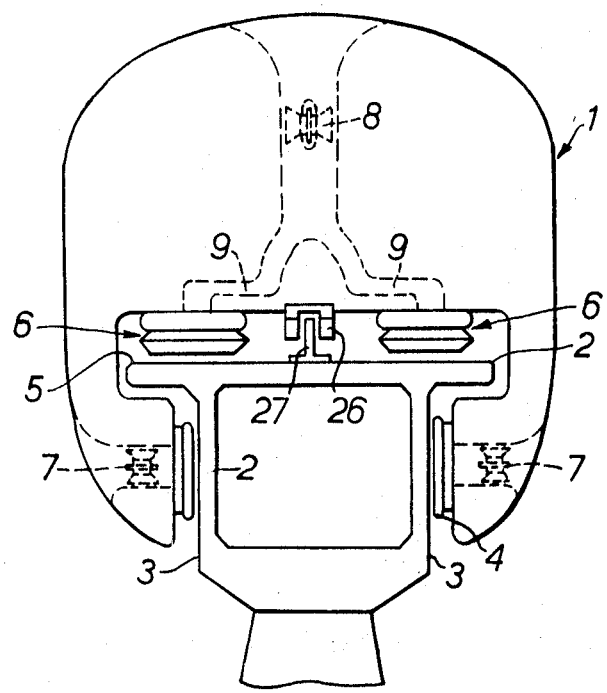
FIG. 2 is a diagrammatic cross-sectional view along the line II—II of FIG. 1.

FIGS. 1 and 2 show a vehicle 1 for travelling along a prepared concrete track 2. The track has vertical side surfaces 3 with which gas cushion load-bearing guidance devices 4 on the vehicle cooperate to guide the vehicle 1. The track 2 also has a horizontal top surface 5 with which gas cushion load-bearing supporting devices 6 on the vehicle 1 cooperate to support the vehicle 1.

The vehicle 1 is propelled by a linear induction motor stator 26 connected to the vehicle which cooperates with a reaction rail 27 extending along the track 2.

As can be seen in FIGS. 1 and 2 there are two pairs of load-bearing devices 4 and 6, and each device (as seen in plan) has two long sides parallel to the length of the vehicle and two rounded ends. The guidance devices 4 are each supplied with pressurized air by means of fans 7 and have gas outlet ports about their periphery from which the pressurized air issues in the form of an air curtain which contains an air cushion. The cushion members are movably connected to the vehicle 1 by a suspension system of the kind described in U.S. Pat. No. 3,477,387.

Figure 3:
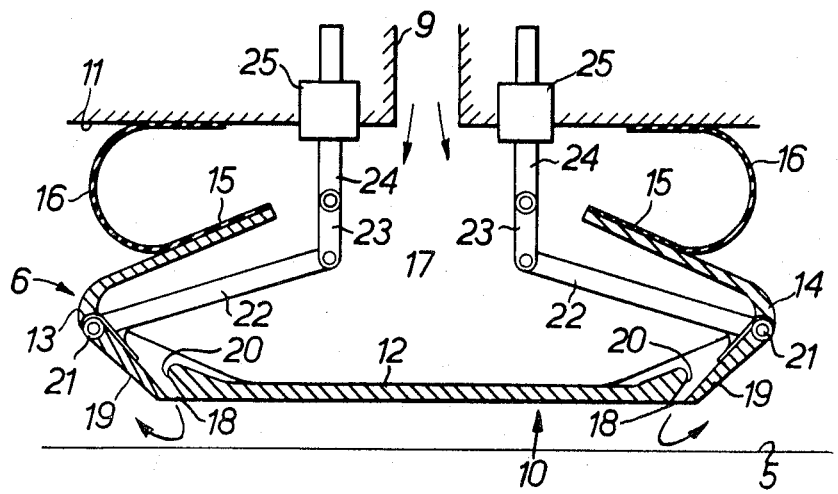
FIG. 3 is a diagrammatic view of part of FIG. 2 in more detail showing one embodiment of a supporting device according to the invention.
Figure 5:
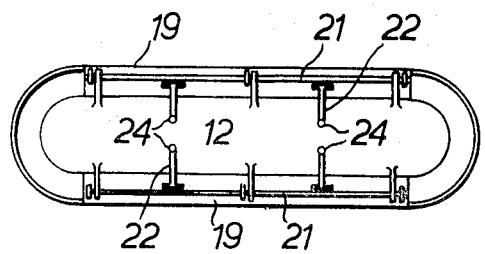
FIG. 5 is a cutaway plan view of the device shown in FIG. 3.
Figure 4:
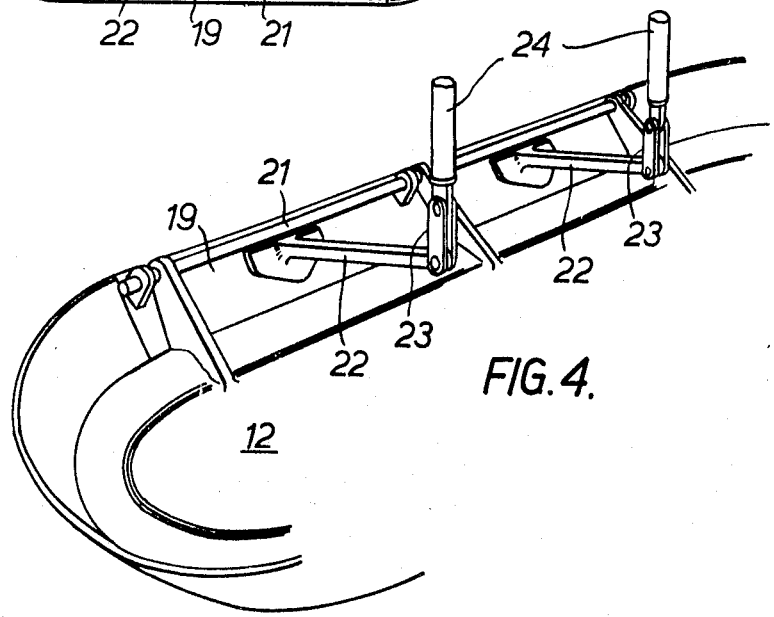
FIG. 4 is a perspective view of the device shown in FIG. 3.

The arrangement of both pairs of supporting devices 6 is the same and only one device 6 is shown in FIGS. 3 and 4. The devices 6 are fed with pressurized air from a fan 8 by ducts 9.

Each supporting device 6 includes a gas cushion member 10 and a load member 11 which forms part of the vehicle 1. The gas cushion member 10 has two longer parallel sides 13 and 14 parallel to the direction of travel of the vehicle. It has a base 12 and an inclined wall 15 extends around the base 12, the inclination being such that the inner edge of the wall 15 is closer to the load member 11 than the outer edge. A membrane 16 is connected at its ends to the inclined wall 15 and to the load member 11. The gas cushion member 10, the membrane 16 and the load member 11 form a chamber 17 which receives pressurized air from the duct 9. Under the air pressure in the chamber 17 the membrane 16 assumes a convex shape as seen from outside the chamber 17.

Inwardly inclined gas outlet ports 18 are formed around the periphery of the cushion member 6 by movable walls 19 and inclined surfaces 20 on the edges of the base 12. The movable walls 19 are pivoted at 21 to the sides of the cushion member 10. Arms 22 rigidly connected to the walls 19 extend inwardly within the chamber 17 and are connected by links 23 to rods 24 extending downwardly from the load member 11. The arms 22, links 23 and rods 24 form linkages connecting the movable walls 19 to the load member 11. The rod 24 of one linkage is laterally spaced from the rod 24 of the other linkage so that the linkage on each side connects its movable wall 19 with the load member on the same side.

In the equilibrium condition pressurized gas from the chamber 17 issues from the gas outlet ports 18 and forms a gas curtain which assists in containing a gas cushion under the base 12. The cushion is normally between 1 and 10 centimeters thick. If the surface 5 of the track 2 is uneven and rises locally the cushion member 6 will rise and the membrane 16 will therefore progressively engage the inclined wall 15. The gas in the chamber 17 will therefore act on an effectively larger area of the cushion member 10 as it rises so that there is increasing resistance to upward movement of the cushion member 10. The membrane 16 permits a movement of the cushion member 10 of plus or minus about 10 centimeters.

Movement of the cushion member 10 upwardly will result in the linkage 22, 23, 24 pivoting the walls 19 so as to increase the effective areas of the gas outlet ports 18 on both sides and so increases the curtain thickness. This results in the height of the cushion member 10 above the track surface 5 remaining more nearly constant.

If the vehicle rolls, one side of the load member will approach the track surface 5 relative to the other side. Because of the stiffness provided by the flexible membrane this will result in a rolling moment of the same sense on the gas cushion member. A gas cushion, however, has a small inherent stiffness to rolling moments so that the cushion member 6 will tend to stay more nearly parallel to the track than the vehicle. The linkage 22, 23, 24 on the lower side will therefore pivot the wall 19 and increase the effective area of the gas outlet port 18, so increasing the curtain thickness at the lower side. This will in turn produce a local increase in cushion pressure on the lower side which will increase the cushion stiffness to the rolling moment on the gas cushion member. This increased cushion stiffness will be referred back to the vehicle by the flexible membrane, so producing a force tending to counter the rolling movement of the vehicle.

Each of the rods 24 is connected to an adjuster, or servo trimming device 25 which automatically extends or retracts the rods 24 to adjust the initial setting of the curtain thickness to suit the load carried by the device.

In a modified arrangement on a vehicle, instead of there being two supporting devices 6 side by side on the vehicle 1, a single wide supporting device similar to the device 6 extends over substantially the whole width of the vehicle.

It is to be understood that the invention is equally applicable to the gas cushion load-bearing guidance devices 4 for guiding the vehicle 1.

I claim:

1. A gas cushion load-bearing device for spacing a load member from a bearing surface, comprising a gas cushion member mounted on the load member for relative movement towards and away therefrom and including curtain-forming means for forming a curtain of moving gas for peripherally containing, at least in part, a load-bearing gas cushion formed between the gas cushion member and the bearing surface, the device further comprising gas supply means for supplying gas to the curtain-forming means whereby to form the said gas curtain, the curtain-forming means comprising relatively movable spaced surfaces between which curtain-forming gas passes, and means responsive to relative movements of the gas cushion member and the load member towards and away from another for moving the said spaced surfaces relative to one another in accordance with the said relative movements of the gas cushion member and load member to thereby automatically vary the cushion-containing quality of the gas curtain.

2. A gas cushion load-bearing device for spacing a load member from a bearing surface, comprising
a gas cushion member mounted on the load member for relative movement towards and away therefrom and having
a base portion which in use is spaced from the bearing surface by a load-bearing gas cushion and
curtain-forming means for forming a curtain of moving gas for peripherally containing, at least in part, the said gas cushion,
gas supply means for supplying gas from the load member to the curtain-forming means whereby to form the gas curtain and comprising
a flexible duct connected between the gas cushion member and the load member, the curtain-forming means comprising first and second relatively movable spaced surfaces between which curtain-forming gas passes, and
a linkage connecting the gas cushion member to the load member and arranged, in response to relative movements of the gas cushion member and the load member towards and away from one another, to constrain the first surface of said curtain-forming means to move relatively to the second surface in accordance with the said relative movements of the gas cushion member and the load member and thereby to automatically vary the cushion-containing quality of the gas curtain.

3. A gas cushion load-bearing device for spacing a load member from a bearing surface, comprising
a gas cushion member mounted on the load member for relative movement towards and away therefrom and having
a base portion which in use in spaced from the bearing surface by a load-bearing gas cushion and
curtain-forming means for forming a curtain of moving gas for peripherally containing, at least in part, the said gas cushion, at least one of the gas cushion member and the load member having a wall portion in spaced opposition to the other member,
gas supply means for supplying gas from the load member to the curtain-forming means whereby to form the gas curtain and comprising
a flexible duct connected between the gas cushion member and the load member to form a gas chamber and having a fold which is concave towards said chamber and which is arranged progressively to contact the wall portion with relative approaching movement of the gas cushion member and the load member whereby to provide increasing resistance to such movement,
the curtain-forming means comprising first and second relatively movable surfaces spaced apart generally radially of the device and defining therebetween a gas outlet port for curtain-forming gas to issue, and
a linkage connecting the gas cushion member to the load member and arranged, in response to a relative approaching movement of the gas cushion member and the load member, to move the first surface of said curtain-forming means away from the second surface in accordance with the said relative approaching movement of the gas cushion member and the load member and thereby to automatically increase the thickness, and hence the cushion-containing quality, of the gas curtain.

4. A gas cushion load-bearing device according to claim 3 which comprises two said curtain-forming means and a said linkage for each curtain-forming means, the two curtain-forming means being located at peripherally disposed opposed parts of the gas cushion member whereby differentially to provide a force countering tilting of the gas cushion member relative to the bearing surface and in unison to maintain substantially constant the spacing of the gas cushion member from the bearing surface.

5. A gas cushion load-bearing device according to claim 4, wherein each linkage includes adjustment means adjustable for setting the initial spacing of the first and second surfaces of the associated curtain-forming means in accordance with the load to be carried.

6. A gas cushion load-bearing device according to claim 3, wherein the linkage extends longitudinally through the flexible duct between the gas cushion member and the load member.

7. A gas cushion load-bearing device for spacing a load member from a bearing surface, comprising
 a gas cushion member mounted on the load member for relative movement towards and away therefrom and having
  a base portion which in use is spaced from the bearing surface by a load-bearing gas cushion and
  curtain-forming means for forming a curtain of moving gas for peripherally containing, at least in part, the said gas cushion, at least one of the gas cushion member and the load member having a wall portion in spaced opposition to the other member,
 gas supply means for supplying gas from the load member to the curtain-forming means whereby to form the gas curtain and comprising
  a flexible duct connected between the gas cushion member and the load member to form a gas chamber and having a fold which is concave towards said chamber and which is arranged progressively to contact the wall portion with relative approaching movement of the gas cushion member and the load member whereby to provide increasing resistance to such movement,
  the curtain-forming means comprising a first, outer member and a second, inner member spaced apart generally radially of the device and defining therebetween a gas outlet port for curtain-forming gas to issue,
  the first member being pivotally movable towards and away from the second member, and
 a linkage connecting the first member to the load member and arranged, in response to a relative approaching movement of the gas cushion member and the load member, to move the first member away from the second member in accordance with the said relative approaching movement of the gas cushion member and the load member and thereby to automatically increase the thickness, and hence the cushion-containing quality, of the gas curtain.

8. A gas cushion load-bearing device for spacing a load member from a bearing surface, comprising
 a gas cushion member mounted on the load member for relative movement towards and away therefrom and having
  a base portion which in use is spaced from the bearing surface by a load-bearing gas cushion,
  a wall portion arranged in spaced opposition to the load member and inclined towards the load member inwardly of the gas cushion member, and
  curtain-forming means at each of two peripherally disposed parts of the gas cushion member for forming curtains of moving gas for peripherally containing, at least in part, the said gas cushion,
 gas supply means for supplying gas from the load member to the curtain-forming means whereby to form the gas curtain and comprising
  a flexible membrane extending between the wall portion and the load member to form a gas chamber and having a single fold which is concave to said chamber and which is arranged progressively to contact the wall portion with relative approaching movement of the gas cushion member and the load member whereby to provide increasing resistance to such movement,
  each curtain-forming means comprising a first, outer member and a second, inner member spaced apart generally radially of the device and defining therebetween a gas outlet port for curtain-forming gas to issue,
  the first member being pivotally movable towards and away from the second member, and
 a linkage for each gas curtain-forming means connecting the respective first member to the load member longitudinally through the flexible membrane and arranged, in response to a relative approaching movement of the respective part of the gas cushion member and the load member, to move the first member away from the second member in accordance with the said relative approaching movement of the respective part of the gas cushion member and the load member and thereby to automatically increase the thickness, and hence the cushion-containing quality, of the gas curtain,
 the curtain-forming means being disposed at opposed parts of the gas cushion member whereby differentially to provide a force countering tilting of the gas cushion member relative to the bearing surface and in unison to maintain substantially constant the spacing of the gas cushion member from the bearing surface.

9. A gas cushion vehicle adapted for operation along a prepared track having a substantially horizontal upper surface for supporting the vehicle, comprising a gas cushion load-bearing device carried by the vehicle for spacing the vehicle from the upper surface of the track, said device including a gas cushion member mounted on the vehicle for relative movement towards and away therefrom and having curtain-forming means for forming a curtain of moving gas for peripherally containing, at least in part, a load-bearing gas cushion formed between the gas cushion member and the upper surface of the track, the device further comprising gas supply means for supplying gas to the curtain-forming means whereby to form the said gas curtain, the curtain-forming means comprising relatively movable spaced surfaces between which curtain-forming gas passes, and means responsive to relative movements of the gas cushion member and the vehicle towards and away from on another for moving the said spaced surfaces relative to one another in accordance with the said relative movements of the gas cushion member and the vehicle to thereby automatically vary the cushion-containing quality of the gas curtain.

10. A gas cushion vehicle adapted for operation along a prepared track having a substantially horizontal upper surface for supporting the vehicle, comprising a pair of gas cushion load-bearing devices carried by the vehicle in side-by-side relationship for spacing the vehicle from the upper surface of the track, each of said devices including a gas cushion member mounted on the vehicle for relative movement towards and away therefrom and having a base portion which in use is spaced from the upper surface of the track by a load-bearing gas cushion and curtain-forming means for forming a curtain of moving gas for peripherally containing, at least in part, the said gas cushion, at least one of the gas cushion member and the vehicle having a wall portion in spaced opposition to the other, a source of pressurized gas carried by the vehicle, gas supply means for supplying gas from said source to the curtain-forming means of both of said gas cushion members whereby to form the gas curtains and comprising a flexible duct connected between each gas cushion member and the vehicle to form a gas chamber and having a fold which is concave towards said chamber and which is arranged progressively to contact the wall portion with relative approaching movement of the respective gas cushion member and the vehicle whereby to provide increasing resistance to such movement, each of said curtain-forming means comprising first and second relatively movable surfaces spaced apart generally radially of the associated gas cushion member and defining therebetween a gas outlet for curtain-forming gas to issue, and a linkage connecting each gas cushion member to the vehicle and arranged, in response to a relative approaching movement of said gas cushion member and the vehicle, to move the first surface of said curtain-forming means away from the second surface in accordance with the said relative approaching movement of said gas cushion member and the vehicle and thereby to automatically increase the thickness, and hence the cushion-containing quality, of the gas curtain of said gas cushion member.

* * * * *